United States Patent
Kim et al.

(10) Patent No.: US 11,449,600 B2
(45) Date of Patent: Sep. 20, 2022

(54) SYSTEM AND METHOD FOR GENERATING SECURITY PROFILE OF CONTAINER INSTANCE

(71) Applicant: ELECTRONICS AND TELECOMMUNICATIONS RESEARCH INSTITUTE, Daejeon (KR)

(72) Inventors: Sung-Jin Kim, Daejeon (KR); Hyunyi Yi, Incheon (KR); Chulwoo Lee, Daejeon (KR); Woomin Hwang, Daejeon (KR); Hyoung-Chun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 563 days.

(21) Appl. No.: 16/411,354

(22) Filed: May 14, 2019

(65) Prior Publication Data
US 2020/0285733 A1    Sep. 10, 2020

(30) Foreign Application Priority Data
Mar. 8, 2019    (KR) ........................ 10-2019-0026806

(51) Int. Cl.
*G06F 21/53*    (2013.01)
*G06F 9/455*    (2018.01)

(52) U.S. Cl.
CPC .............. *G06F 21/53* (2013.01); *G06F 9/455* (2013.01); *G06F 2221/034* (2013.01)

(58) Field of Classification Search
CPC .... G06F 21/53; G06F 9/455; G06F 2221/034; G06F 2221/033; G06F 21/562; G06F 21/52
See application file for complete search history.

(56) References Cited

U.S. PATENT DOCUMENTS

| | | | |
|---|---|---|---|
| 8,887,056 B2 | 11/2014 | Breternitz et al. | |
| 9,690,622 B1 | 6/2017 | Argenti et al. | |
| 10,878,119 B2* | 12/2020 | Stoler | G06F 21/31 |
| 10,885,200 B2* | 1/2021 | Ciano | G06F 21/577 |

(Continued)

FOREIGN PATENT DOCUMENTS

| | | |
|---|---|---|
| KR | 10-2014-0090571 A | 7/2014 |
| KR | 10-2015-0031502 A | 3/2015 |

(Continued)

OTHER PUBLICATIONS

Andrej Yemelianov, "Containers and Security: Seccomp", Jul. 25, 2017.*

(Continued)

*Primary Examiner* — Beemnet W Dada
(74) *Attorney, Agent, or Firm* — LRK Patent Law Firm

(57) ABSTRACT

An operation method of a system for generating a security profile of a security instance includes extracting executable code and a library file from a container, thereby identifying a target to be analyzed; performing binary static analysis for the executable code and the library file in order to generate a system call list; and generating a Secure Computing Mode (SECCOMP) security profile based on the system call list.

16 Claims, 12 Drawing Sheets

(56) References Cited

U.S. PATENT DOCUMENTS

| | | | |
|---|---|---|---|
| 10,908,887 B2 * | 2/2021 | Bhat | G06F 8/60 |
| 10,997,283 B2 * | 5/2021 | Gerebe | H04L 9/0643 |
| 2014/0195818 A1 | 7/2014 | Neumann et al. | |
| 2017/0116415 A1 * | 4/2017 | Stopel | G06F 21/53 |
| 2020/0301375 A1 | 9/2020 | Dull et al. | |

FOREIGN PATENT DOCUMENTS

| | | |
|---|---|---|
| KR | 10-2016-0031590 A | 3/2016 |
| KR | 10-1741131 B1 | 5/2017 |
| KR | 10-2018-0125156 A | 11/2018 |

OTHER PUBLICATIONS

Lingguang Lei et al., "SPEAKER: Split-Phase Execution of Application Containers," DIMVA 2017: Detection of Intrusions and Malware, and Vulnerability Assessment, 2017.

Qiang Zeng et al., "Tailored Application-specific System Call Tables," Tech rep., Technical report, Pennsylvania State University, 2014.

\* cited by examiner

FIG. 3
①
mov $1, %eax
syscall
②
cmp $1, %eax
je equal
mov $0, %eax
jmp over
equal:
 mov $1, %eax
over:
 syscall
③
mov $1, %edi
call abcd <syscall@plt>
FIG. 4
①
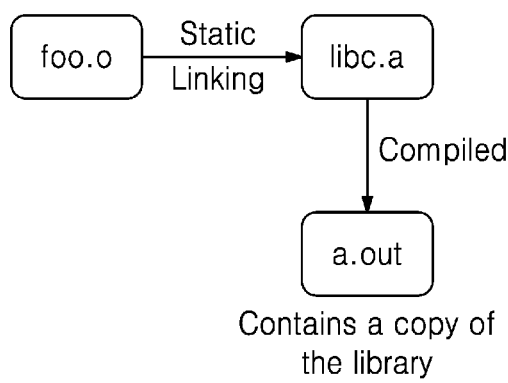
Contains a copy of
the library
②
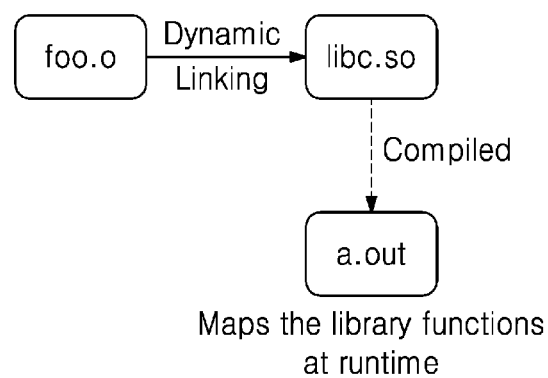
Maps the library functions
at runtime

FIG. 5

Dynamic section at offset 0xe30 contains 22 entries:
```
  Tag        Type                    Name/Value
 0x0000000000000001 (NEEDED)         Shared library: [libssl.so.1.0.0]
 0x0000000000000001 (NEEDED)         Shared library: [libc.so.6]
 0x000000000000000c (INIT)           0x400520
 0x000000000000000d (FINI)           0x400758
```

FIG. 6

Symbol table '.dynsym' contains 6 entries:

| Num: | Value | Size | Type | Bind | Vis | Ndx | Name |
|---|---|---|---|---|---|---|---|
| 0: | 00000000 | 0 | NOTYPE | LOCAL | DEFAULT | UND | |
| 1: | 00000000 | 0 | FUNC | GLOBAL | DEFAULT | UND | perror@GLIBC_2.0 (2) |
| 2: | 00000000 | 0 | FUNC | GLOBAL | DEFAULT | UND | puts@GLIBC_2.0 (2) |
| 3: | 00000000 | 0 | NOTYPE | WEAK | DEFAULT | UND | __gmon_start__ |
| 4: | 00000000 | 0 | FUNC | GLOBAL | DEFAULT | UND | __libc_start_main@GLIBC_2.0 (2) |
| 5: | 080484fc | 4 | OBJECT | GLOBAL | DEFAULT | 15 | _IO_stdin_used |

FIG. 10

| CONTAINER INSTANCE INFORMATION | INFORMATION ABOUT INSTALLED APPLICATION | SECCOMP SECURITY PROFILE |
|---|---|---|
| UNIQUE INFORMATION CONCERNING CONTAINER INSTANCE (CONTAINER ID, IMAGE ID, TAG NAME, ETC.) | nginx v.1.8.0 | "syscalls":[<br>⋮<br>(<br>  "names":[<br>    "accept",<br>    "accept4",<br>    "access",<br>⋮<br>(SECCOMP PROFILE IN JSON FORMAT IN CASE OF DOCKER) |

SYSTEM AND METHOD FOR GENERATING SECURITY PROFILE OF CONTAINER INSTANCE

CROSS REFERENCE TO RELATED APPLICATION

This application claims the benefit of Korean Patent Application No. 10-2019-0026806, filed Mar. 8, 2019, which is hereby incorporated by reference in its entirety into this application.

BACKGROUND OF THE INVENTION

1. Technical Field

The present invention relates generally to a system and method for generating a security profile for a container instance.

2. Description of the Related Art

Generally, a Secure Computing Mode (SECCOMP) is a kind of system-hardening technique, which is used to reduce the attack surface of an operating system (OS) kernel. SECCOMP blocks access to system calls that are not necessary for the operation of a process, thereby eliminating the possibility that the corresponding system calls will be used to exploit a vulnerability. The mode of SECCOMP may be set to 0, 1 or 2, among which mode 2 supports process execution based on a user-defined security profile. Using the security profile, a user may restrict system calls that a certain process can invoke. In a container virtualization environment, each container instance is regarded as a single process. Therefore, system calls invoked by a container instance may be restricted using SECCOMP.

DOCUMENTS OF RELATED ART (Patent Document 1) U.S. Patent Application Publication No. 2017/0116415, published on Apr. 27, 2017 and titled "Profiling of container images and enforcing security policies respective thereof", and (Patent Document 2) U.S. Pat. No. 9,690,622, published on Jun. 27, 2017 and titled "Stateless instance backed mobile devices".

SUMMARY OF THE INVENTION

An object of the present invention is to provide a system and method for generating a security profile for a container instance, which perform static code analysis for the binaries of an application within a container in a container virtualization environment, thereby extracting candidates for system calls expected to be used by the application.

An operation method of a system for generating a security profile of a security instance according to an embodiment of the present invention may include extracting executable code and a library file from a container, thereby identifying a target to be analyzed; performing binary static analysis for the executable code and the library file in order to generate a system call list; and generating a Secure Computing Mode (SECCOMP) security profile based on the system call list.

In an embodiment, identifying the target to be analyzed may include requesting image metadata and an image file, corresponding to the container, from container image storage; acquiring the image metadata and the image file from the container image storage; and running the container using the image metadata and the image file.

In an embodiment, identifying the target to be analyzed may further include identifying the executable code and the library file, which are loaded with the container when the container is run; and extracting the identified executable code and library file.

In an embodiment, proc filesystem information of the container running in a host may be checked, and then the executable code and the library file may be collected using a container management interface such as docker CLI.

In an embodiment, performing the binary static analysis may include identifying a dynamic linking relationship between the executable code and the library file; identifying direct or indirect system calls invoked in the executable code or the library file; and generating the system call list for the identified system calls.

In an embodiment, performing the binary static analysis may further include performing detailed control flow analysis in order to trace the value of an Extended Accumulator Register (EAX) or an rdi/edi register referred to by the direct or indirect system calls.

In an embodiment, generating the SECCOMP security profile may include generating a whitelist for system calls using the system call list.

In an embodiment, generating the SECCOMP security profile may further include generating the SECCOMP security profile in a JSON format in a docker container environment.

In an embodiment, the operation method may further include adding the generated SECCOMP security profile in a security profile save location in a container host.

In an embodiment, when the container is run, the container host may filter system calls invoked by the container based on the SECCOMP security profile.

A system for generating a security profile of a security instance according to an embodiment of the present invention may include at least one processor; and memory for storing at least one instruction executed by the at least one processor. The at least one instruction may be configured such that an analysis target identification subsystem identifies an analysis target by extracting executable code and a library file from a container, such that a binary static analysis subsystem performs binary static analysis for the executable code and the library file in order to generate a system call list, and such that a security profile generation subsystem generates a Secure Computing Mode (SECCOMP) security profile based on the system call list, wherein the analysis target identification subsystem, the binary static analysis subsystem, and the security profile generation subsystem may be virtualized systems.

In an embodiment, the analysis target identification subsystem may include a container instance execution module for running the container after acquiring an image corresponding to the container from container image storage; an information collection module for collecting information about an application and a shared library executed inside the container; and an analysis target identification module for extracting the executable code and the library file from the filesystem of the container based on the collected information.

In an embodiment, the binary static analysis subsystem may include a binary dependency analysis module for detecting a reference relationship between the executable code and the library file; a system call identification module for identifying direct or indirect system calls invoked in the executable code and the library file; and a detailed control flow analysis module for analyzing detailed control flow through control flow tracking, symbolic execution, or concolic testing in order to trace a value of a register referred by the system call. (For reference, in the case of a syscall instruction in a disassembled binary, it is necessary to trace the value of an Extended Accumulator register (EAX), which corresponds to the argument thereof, and in the case of the Linux syscall( ) function, it is necessary to trace the value of a rdi/edi register, which corresponds to the argument thereof).

In an embodiment, the security profile generation subsystem may include a security profile conversion module for receiving the system call list and generating a security profile in a format used in a container host; a security profile delivery module for saving the security profile in a security profile save location in the container host; and a security profile database for storing the security profile.

In an embodiment, a record of the security profile database may include container instance information, information about an installed application, and the security profile.

A container virtualization system according to an embodiment of the present invention may include a container host; and a security profile generation system. The security profile generation system may include at least one processor; and memory for storing at least one instruction executed by the at least one processor, wherein the at least one instruction may be configured such that an analysis target identification subsystem identifies an analysis target by extracting executable code and a library file from a container, such that a binary static analysis subsystem performs binary static analysis for the executable code and the library file in order to generate a system call list, and such that a security profile generation subsystem generates a Secure Computing Mode (SECCOMP) security profile based on the system call list.

BRIEF DESCRIPTION OF THE DRAWINGS

The above and other objects, features and advantages of the present invention will be more clearly understood from the following detailed description taken in conjunction with the accompanying drawings, in which:

FIG. 3 is an exemplary view that shows a result of disassembling a binary, which is performed in order to identify a direct system call invoked by the binary;

FIG. 4 is an exemplary view that shows the generation of a binary using a static link and the generation of a binary using a dynamic link;

FIG. 5 is an exemplary view that shows information about called external shared libraries identified using a readelf command, which is a binary analysis tool;

FIG. 6 is an exemplary view that shows information about functions called by an external shared library, which are identified using a readelf command, which is a binary analysis tool;

FIG. 10 is an exemplary view that shows a record stored in a security profile database according to an embodiment of the present invention;

DESCRIPTION OF THE PREFERRED EMBODIMENTS

Figure 1:
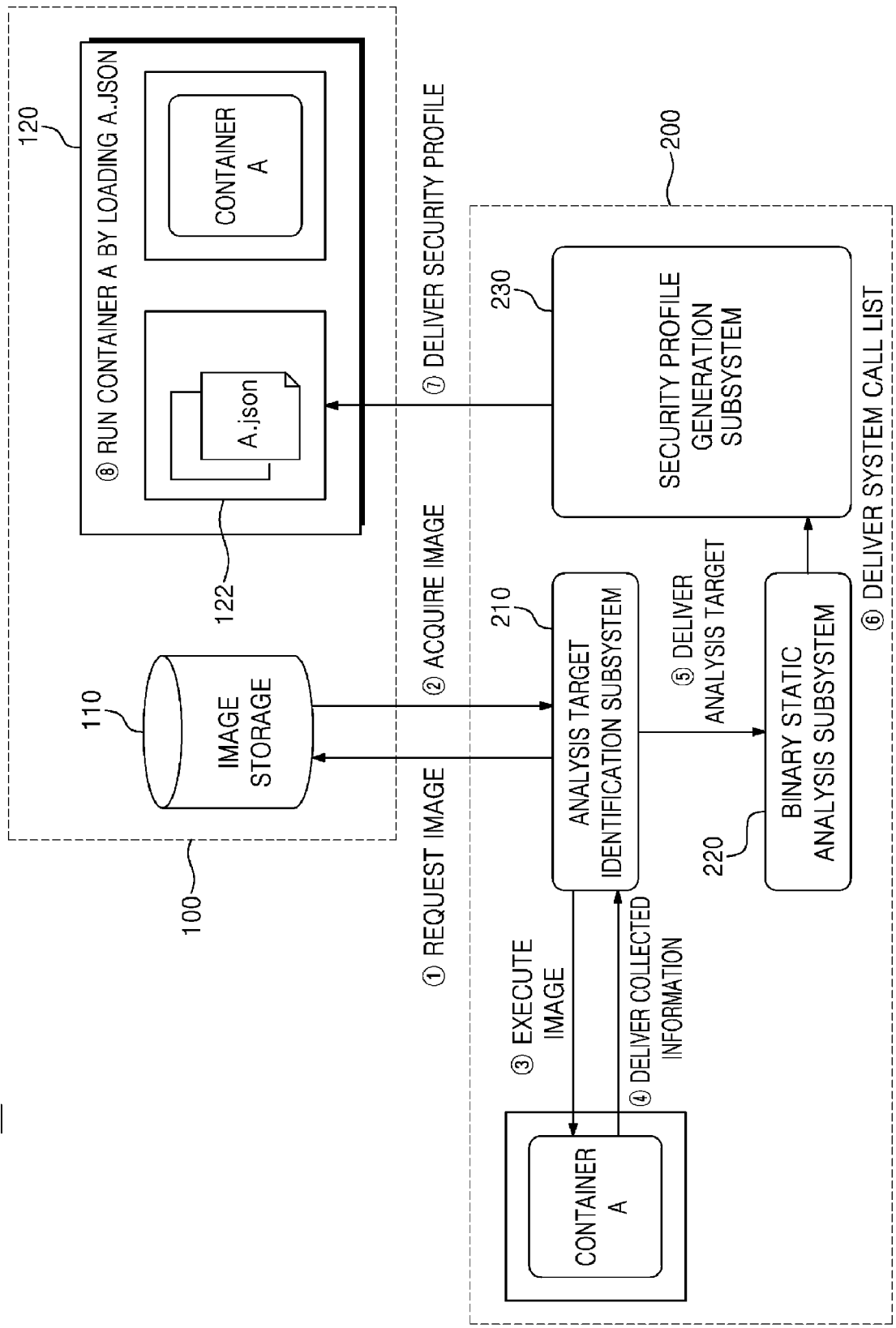
FIG. 1 is an exemplary view that shows a container virtualization system according to an embodiment of the present invention.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms.

These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Meanwhile, other expressions describing relationships between components, such as "between", "immediately between" or "adjacent to" and "directly adjacent to" may be construed similarly. Also, terms used herein are merely used to describe specific embodiments, and are not intended to limit the present invention. A singular expression includes a plural expression unless a description to the contrary is specifically pointed out in context.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Generally, methods for generating a security profile are largely categorized into two approaches.

The first approach is generating a security profile by manually identifying system calls that are not being used at present or system calls that can cause a security issue. A docker container forcibly applies Secure Computing Mode (SECCOMP) when running a container instance, thereby restricting the types of system calls that can be used by the container instance. Here, the applied default security profile denies access to about 50 system calls using a blacklist in consideration of the security threat levels thereof and the frequency with which each of the system calls is actually used, among about 350 Linux system calls. For example, most application containers running with user permissions do not need the init_module system call, which is used to load a kernel module. When access to the corresponding system call is allowed, a malicious user may tamper with a shared kernel image, and thus it is desirable to deny access thereto.

The second approach is explicitly identifying system calls used by a container instance through dynamic analysis and generating a security profile for permitting access only to the corresponding system calls. For example, when a container instance for providing the Apache web server is run, system calls explicitly invoked while the container instance is running are identified using a system call monitoring tool, such as strace or the like, whereby a whitelist for system calls to which access should be allowed may be written and applied.

The respective approaches have the following advantages and disadvantages. A security profile generated through the first approach (using a blacklist) is advantageous in that it is commonly used without being affected by the characteristics of a container instance. However, a system call that is allowed to be used but is not actually used by a process may be present. This problem should be solved in order to minimize an attack surface. The second approach (using a whitelist) explicitly checks system calls that are necessary for execution of a container instance, whereby the minimum privileges for allowing access only to system calls that are required for the target application container are granted.

However, it is difficult for the dynamic analysis approach to cover all system call use patterns for the application. If there is a system call that is not identified through dynamic analysis but is used occasionally, a function module using the corresponding system call may not operate, and a container service may be terminated in the very worst case; that is, the availability of the container instance may be reduced. Accordingly, a method for generating a security profile for a container instance, which may minimize the attack surface of a shared kernel while maximizing service availability, is required.

A system and method for generating an instance security profile according to an embodiment of the present invention are configured to perform static analysis on the binaries of an application within a container in a container virtualization environment, thereby extracting candidates for system calls expected to be used by the corresponding application.

FIG. 1 is an exemplary view that shows a container virtualization system 10 according to an embodiment of the present invention. Referring to FIG. 1, the container virtualization system 10 may include a cloud system 100 and a container instance security profile generation system 200.

The cloud system 100 may include image storage 110 and at least one host 120 based on a container.

The container instance security profile generation system 200 is for a container virtualization environment, and may include an analysis target identification subsystem 210, a binary static analysis subsystem 220, and a security profile generation subsystem 230. Each of the analysis target identification subsystem 210, the binary static analysis subsystem 220, and the security profile generation subsystem 230 may be installed in the form of software on a container host operating system (container host OS) or a separate host OS, and may be run thereon.

The analysis target identification subsystem 210 may request image metadata and an image file corresponding to container A from the image storage 110 (①) and acquire the image file therefrom (②). The analysis target identification subsystem 210 may run the container A (③). Here, information that is necessary for identifying an analysis target within the container A in the host may be collected by referring to the proc filesystem of the container A (e.g., process memory map information in /proc/[the PID of an app running in the container A]/maps). Here, the information to be collected may be information about executable code and a shared library that are executed with the target application when the target application is run.

In an embodiment, the analysis target identification subsystem 210 may receive the collected information (④) and deliver the executable code of the application, which is running inside the container A, and the executable code and the shared library, which are executed with the application, to the binary static analysis subsystem 220 (⑤).

The binary static analysis subsystem 220 may perform static code analysis for the received executable code and shared library. In an embodiment, the binary static analysis subsystem 220 may detect all of direct system calls included in the executable code and the shared library and indirect system calls from libraries referenced in the corresponding files (e.g., standard C libraries). Then, the binary static analysis subsystem 220 may deliver a list comprising the detected system calls to the security profile generation subsystem 230 (⑥).

The security profile generation subsystem 230 may generate a whitelist including the system calls included in the received list. In an embodiment, the security profile generation subsystem 230 may generate a SECCOMP profile in a JSON format in a docker container environment. Then, the security profile generation subsystem 230 may add the generated security profile, described in A.json, in the security profile save location 122 in the container host 120 (⑦). When the container A is run, the container host 120 may restrict system calls that the container A can invoke using SECCOMP with reference to A.json (⑧).

The container virtualization system 10 according to an embodiment of the present invention generates a security profile through which privileges that allow a container instance to invoke system calls may be minimized and through which high availability of the container instance may be ensured. Accordingly, the possibility of a container escape problem, which exploits the vulnerability of system calls, may be minimized, and the problem in which the availability of a container is reduced due to application of the wrong security profile may be solved.

Figure 2:
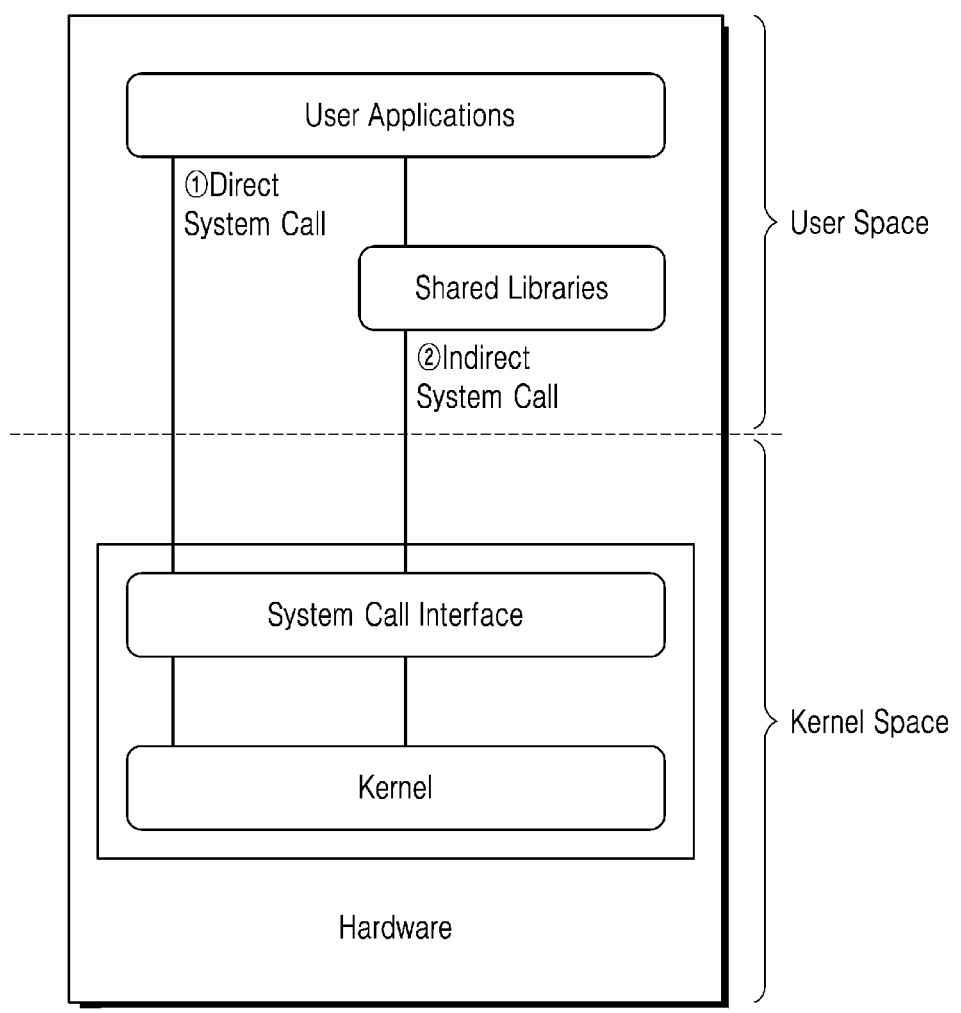
FIG. 2 is an exemplary view that shows a system call invoked by a general Linux binary.

FIG. 2 is an exemplary view that shows a system call invoked by a general Linux binary. Referring to FIG. 2, in order to use system resources, a Linux binary directly dispatches a system call to an OS kernel or indirectly invokes a system call through a shared library or the like.

Generally, an application run with user privileges uses an approach in which a system call is indirectly invoked through a standard library, such as glibc or the like, as shown in ② of FIG. 2.

The analysis target identification subsystem 210 according to an embodiment of the present invention may detect all of direct system calls (①) and indirect system calls (②) invoked by target binaries.

Meanwhile, in order to identify the system calls to be invoked by a binary through static analysis, it is necessary to disassemble the corresponding binary.

FIG. 3 is an exemplary view that shows the result of disassembly performed in order to identify direct system calls invoked by a binary.

In FIG. 3, ① shows the case in which the system call to be invoked in binary code is explicitly known. In the Linux ELF binary, a system call is invoked using the syscall instruction. Here, an integer value in an Extended Accumulator Register (EAX) is read. In FIG. 3, ① shows invocation of 'sys_write', of which the system call number is 1.

In FIG. 3, ② shows the case in which the type of system call to be invoked varies depending on a jump instruction. In this case, it is necessary to trace code control flow backwards in order to detect the value of the eax register. In the example, if the value of the eax register is equal to 1, a system call of which the system call number is 1 is invoked, but otherwise, a system call of which the system call number is 0 is invoked. The corresponding flow in FIG. 3 may be shown when source code includes a branch statement, which changes flow depending on user input or on the state of a running process.

In FIG. 3, ③ shows the case in which a system call is invoked by calling the syscall( ) function. The syscall( ) function takes an integer indicative of the number of the system call to be invoked as the first argument thereof. Here, the argument is the value stored in the rdi or edi register, which is referred to by the syscall( ) function. In the example, '1' is input to the edi register, so 'sys_write', of which the system call number is 1, is invoked.

In an embodiment of the present invention, all of the three cases may be taken into account. Meanwhile, in order to completely extract a list of system calls used by the target application, it is necessary to consider both of the case in which the binary of the target application is compiled through static linking and the case in which the binary thereof is compiled through dynamic linking.

FIG. 4 is an exemplary view that shows the generation of a binary using a static link and the generation of a binary using a dynamic link.

In FIG. 4, ① shows the case in which an object named foo.o is statically linked with libc.a, thereby being compiled to a single file named a.out. Here, a.out contains a portion of the binary code of libc.a and the binary code of foo.o.

In contrast, ② in FIG. 4 shows the case in which the object named foo.o is dynamically linked with libc.so, thereby being compiled to a file named a.out. Here, the binary of a.out does not contain the code of libc.so. That is, libc.so is loaded into memory and referred to when a.out is run. Among the cases ① and ②, the present invention considers only the case ②.

Meanwhile, the code area of a dynamic-link library is not present in the binary of an application. In order to detect reference libraries, it is necessary to detect external library dependency as shown below.

FIG. 5 is an exemplary view that shows information about external shared libraries identified using a readelf command, which is a binary analysis tool. Referring to FIG. 5, the output shows that a binary named samplebin refers to libssl.so.1.0.0 and libc.so.6 at runtime. This information may be extracted using a -d option of the readelf command, in which case readelf refers to the .dynamic section of the ELF header. This information is used to detect shared libraries referred to by a specific binary. That is, this information is helpful to identify the indirect system calls shown in FIG. 2.

FIG. 6 is an exemplary view that shows function call information pertaining to external shared libraries identified using the readelf command, which is a binary analysis tool. Referring to FIG. 6, the output shows that a binary named samplebin refers to perror and puts functions, each having a version string of GLIBC_2.0. This information may be extracted using a -dyn-sym option of the readelf command, in which case readelf refers to .dynsym section of the ELF header.

Based on the external shared library reference information, which is acquired in the examples of FIG. 5 and FIG. 6, the code area to be additionally analyzed may be specified.

Figure 7:
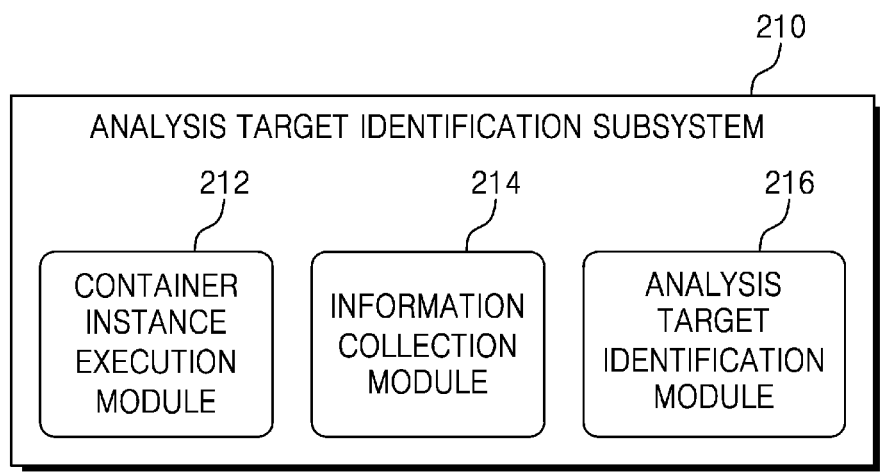
FIG. 7 is an exemplary view that shows an analysis target identification subsystem according to an embodiment of the present invention.

FIG. 7 is an exemplary view that shows the analysis target identification subsystem 210 according to an embodiment of the present invention. Referring to FIG. 7, the analysis target identification subsystem 210 may include a container instance execution module 212, an information collection module 214, and an analysis target identification module 216.

The analysis target identification subsystem 210 may function to detect the executable code of an application and a shared library, which are executed when container A is initiated.

The container instance execution module 212 may receive an image corresponding to the container A from the container image storage 110 by requesting the image therefrom, and may run the container A.

The information collection module 214, which is executed when the container A is initiated, may collect information about the application running inside the container A and shared libraries. In an embodiment, in order to collect the information, the 'maps' file, which is saved in the folder generated with a name corresponding to the process ID of the application to be analyzed in the proc filesystem of the Linux OS, may be referred to. In an embodiment, the information collection module 214 may deliver the collected information to the analysis target identification module 216.

The analysis target identification module 216 may extract the executable code and the shared library, for which binary static analysis is to be performed, from the filesystem of the container A based on the collected information.

Figure 8:
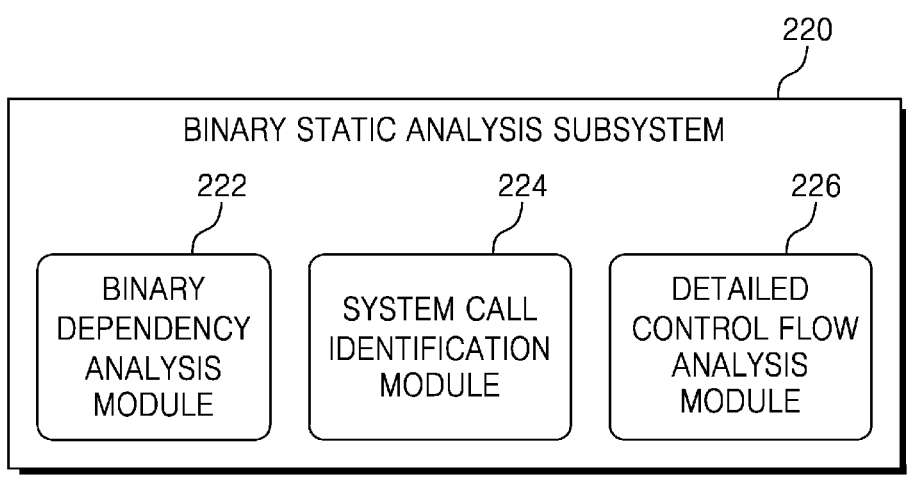
FIG. 8 is an exemplary view that shows a binary static analysis subsystem according to an embodiment of the present invention.

FIG. 8 is an exemplary view that shows the binary static analysis subsystem 220 according to an embodiment of the present invention. Referring to FIG. 8, the binary static analysis subsystem 220 may include a binary dependency analysis module 222, a system call identification module 224, and a detailed control flow analysis module 226.

The binary static analysis subsystem 220 receives binaries to be analyzed and a list of the code areas of the respective binaries and performs static analysis for the binary code areas included in the list, thereby extracting candidates for the system calls that are expected to be used.

In an embodiment, the binary static analysis subsystem 220 may operate using the basic information about a binary, which is described with reference to FIGS. 2 to 6.

The binary dependency analysis module 222 may detect a reference relationship between the executable code and the library using the background information illustrated in FIGS. 4 to 6.

The system call identification module 224 may detect the value of the EAX register, which is referred to by the syscall instruction, and the value of the rdi or edi register, which is referred to by the syscall( ) function, for the cases ①, ② and ③ in FIG. 3.

The detailed control flow analysis module 226 may perform detailed control flow analysis when it is difficult to detect the values of the EAX register and the rdi or edi register because code includes many branch statements, compared to the cases of ①, ② and ③ in FIG. 3. For example, the detailed control flow analysis module 226 may use a method such as control flow tracking, symbolic execution, concolic testing, or the like.

Meanwhile, the system call identification module 224 may deliver a list comprising the identified system calls to the security profile generation subsystem 230.

Figure 9:
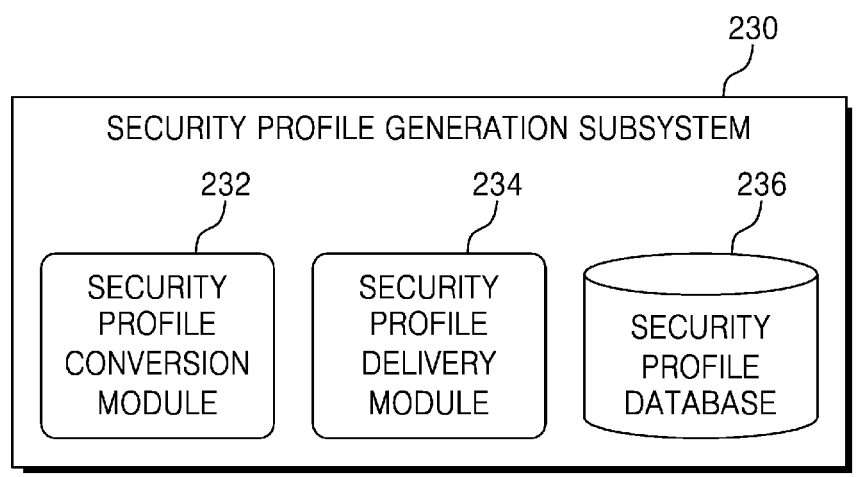
FIG. 9 is an exemplary view that shows a security profile generation subsystem according to an embodiment of the present invention.

FIG. 9 is an exemplary view that shows the security profile generation subsystem 230 according to an embodiment of the present invention. Referring to FIG. 9, the security profile generation subsystem 230 may include a security profile conversion module 232, a security profile delivery module 234, and a security profile database 236.

The security profile generation subsystem 230 may receive the system call list from the binary static analysis subsystem 220 and generate a security profile in the format used in the container host 120. For example, because SECCOMP profiles in a JSON format are used in a docker container environment, the security profile generation subsystem 230 may generate a security profile so as to match the corresponding format.

The security profile conversion module 232 may store the generated security profile in the security profile database 236. Here, the format of the respective records of the security profile database 236 is as shown in FIG. 10. Referring to FIG. 10, a record stored in the security profile database 236 may include container instance information, information about an installed application, and a SECCOMP security profile.

The security profile delivery module 234 may acquire a security profile stored in the security profile database 236 by requesting the same therefrom and store the security profile in the security profile save location 122 in the container host 120.

Figure 11A:
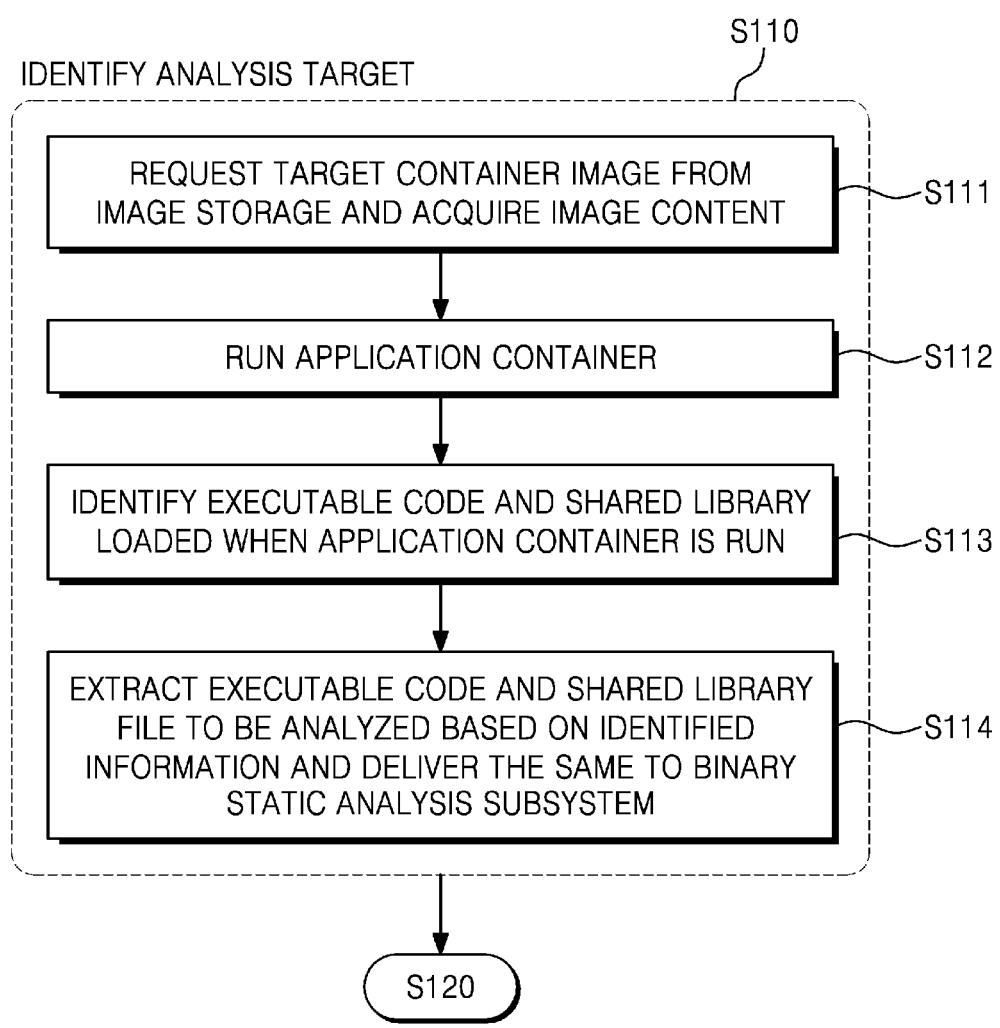
FIGS. 11A, 11B and 11C are exemplary views that show the operation method of a system for generating a security profile for a container instance.
Figure 11B:
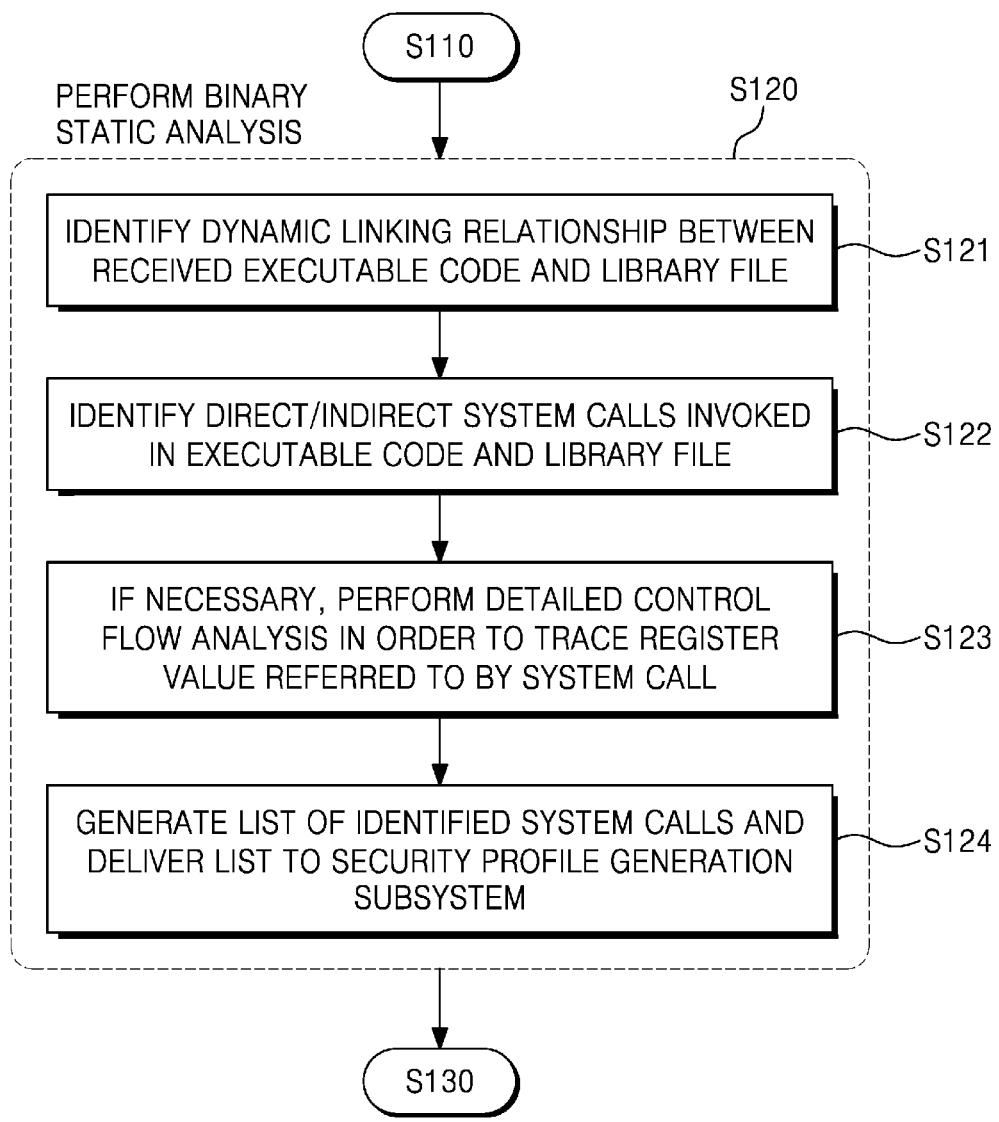
Figure 11C:
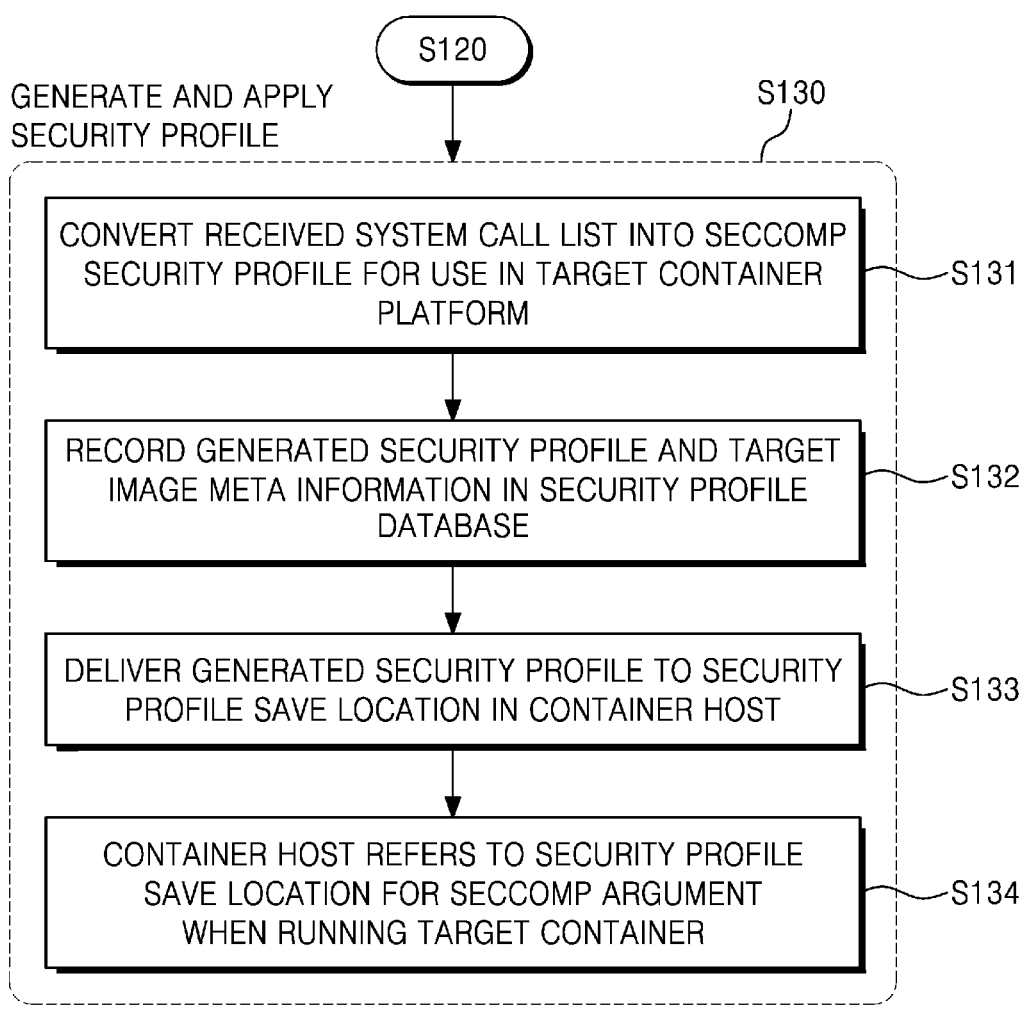

FIGS. 11A, 11B and 11C are exemplary views that show the operation method of the container instance security profile generation system 200. Referring to FIGS. 1 to 11A, 11B and 11C, the operation method of the container instance security profile generation system 200 may include identifying targets to be analyzed at step S110 (FIG. 11A), performing binary static analysis at step S120 (FIG. 11B), and generating and applying a security profile at step S130 (FIG. 11C).

Identifying the target to be analyzed at step S110 may be configured to identify the target for which binary static analysis is to be performed in a target container. Identifying the target to be analyzed at step S110 may include the following steps. The analysis target identification subsystem 210 requests a target container image from image storage and acquires the requested image content at step S111. Then, the application container may be run at step S112. When the application container is run, the analysis target identification subsystem 210 may identify executable code and a library loaded with the application container at step S113. Based on the identified information, the analysis target identification subsystem 210 may extract the executable code and a shared library file to be analyzed and deliver the same to the binary static analysis subsystem at step S114.

Performing binary static analysis at step S120 may be configured to perform binary static analysis for the executable code and the library file received at step S110, thereby generating a whitelist for system calls. Performing binary static analysis at step S120 may include the following steps.

The binary static analysis subsystem 220 may identify a dynamic linking relationship between the received executable code and the received library file at step S121. The binary static analysis subsystem 220 may identify direct/indirect system calls invoked in the executable code and the library file at step S122. If necessary, the binary static analysis subsystem 220 may perform detailed control flow analysis for tracing the value of the EAX register, which is referred to by a system call, at step S123. The binary static analysis subsystem 220 may generate a list comprising the identified system calls and deliver the same to the security profile generation subsystem 230 at step S124.

Generating and applying the security profile at step S130 may be configured to generate a SECCOMP security profile based on the system call list received at step S120 and deliver the same to the container host 120, thereby enabling the SECCOMP security profile to be referred to when the target container is run. Generating and applying the security profile at step S130 may include the follows steps.

The security profile generation subsystem 230 may convert the received system call list into a SECCOMP security profile in a format that can be used in the target container platform at step S131. The security profile generation subsystem 230 may record the generated security profile and meta information pertaining to the target image in the security profile database at step S132. The security profile generation subsystem 230 may deliver the generated security profile to the security profile save location 122 in the container host 120 at step S133. The security profile generation subsystem 230 may use the save location as a SECCOMP argument at step S133 when the container host 120 runs the target container. For example, at step S134, the "docker run" command may be executed with the option "--security-opt SECCOMP=[the file path of A.json]" in a docker container environment, whereby the security profile described in A.json may be applied when the container instance A is run.

According to the configuration of the present invention, a security profile for minimizing privileges that allow a container instance to invoke system calls while ensuring high availability of the container instance in a container virtualization environment may be generated. Consequently, the possibility of a container escape problem, which exploits the vulnerability of system calls, may be minimized, and the problem in which the availability of a container is reduced due to application of the wrong security profile may be solved.

Figure 12:
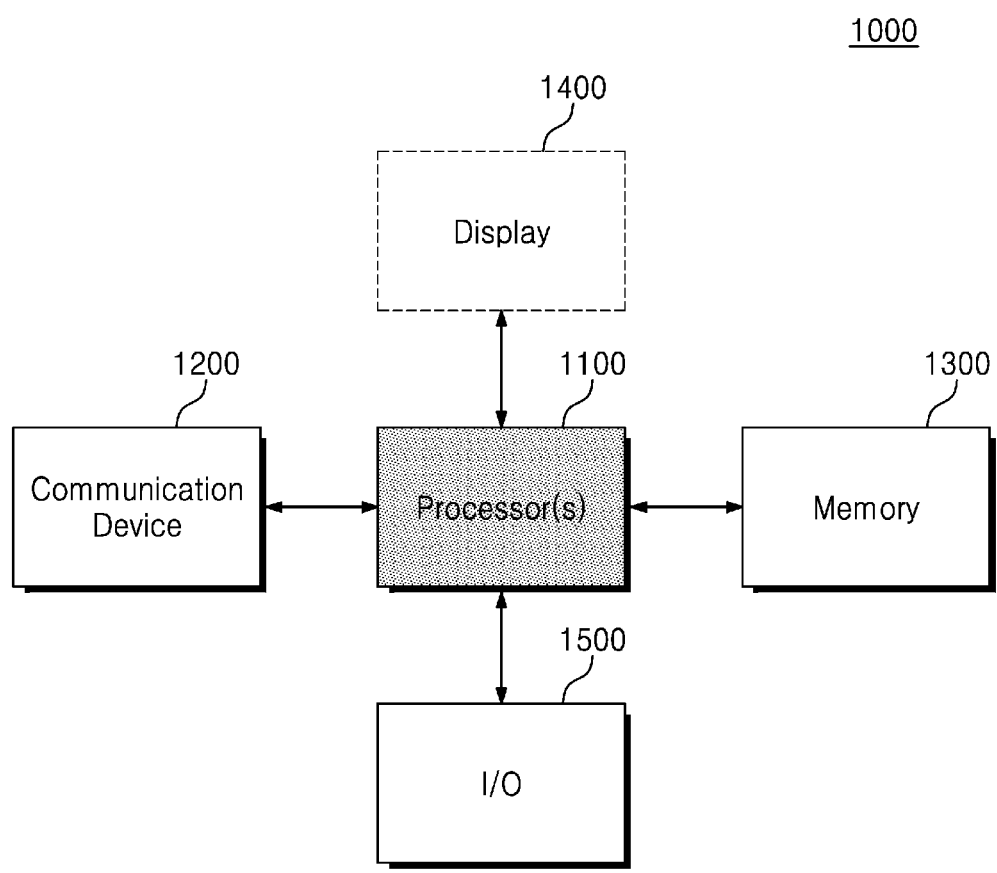
FIG. 12 is an exemplary view that shows a system for generating a security profile for a container instance according to an embodiment of the present invention.

FIG. 12 is an exemplary view that shows the container instance security profile generation system 1000 according to an embodiment of the present invention. Referring to FIG. 12, the container instance security profile generation system 1000 may include at least one processor 1100, a network interface 1200, memory 1300, a display 1400, and input/output devices 1500.

The processor 1100 may include at least one of the devices described with reference to FIGS. 1 to 11, or may be implemented using at least one of the methods described with reference to FIGS. 1 to 11. The processor 1100 may generate a security profile through which privileges that allow a container instance to invoke system calls may be minimized and through which high availability of the container instance may be ensured in a container virtualization environment, thereby minimizing the possibility of a container escape problem, which exploits the vulnerability of system calls, and solving the problem in which the availability of a container is reduced due to the application of the wrong security profile, as described above.

The processor 1100 may run programs and control an electronic system. The electronic system may be connected with an external device (e.g., a personal computer or a network) and exchange data therewith via the I/O devices 1500. The electronic system may be any of various types of electronic systems, including mobile devices such as a mobile phone, a smartphone, a PDA, a tablet PC, a laptop, and the like, computing devices such as a PC, a tablet PC, a netbook, and the like, and electronic devices such as a TV, a smart TV, a security device for gate control, and the like.

The network interface 1200 may be implemented so as to communicate with an external network using various wired/wireless methods.

The memory 1300 may store computer-readable instructions. The processor 1100 may perform the above-described operations by executing the instructions stored in the memory 1300. The memory 1300 may be volatile or nonvolatile memory.

The memory 1300 may include a storage device in order to store user's data. The storage device may be an embedded multimedia card (eMMC), a solid-state drive (SSD), universal flash storage (UFS), or the like. The storage device may include at least one nonvolatile memory device. The nonvolatile memory device may be any one of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random Access Memory (STT-RAM), and the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, and any other device capable of executing instructions and responding thereto. The processing device may run an operating system (OS) and one or more software applications executed on the OS.

Also, the processing device may access, store, manipulate, process, and create data in response to the execution of the software. For the convenience of description, the processing device is described as a single device, but those having ordinary skill in the art may understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The method according to the embodiments may be implemented as program instructions executable by various computer devices, and may be recorded in computer-readable storage media. The computer-readable storage media may separately or collectively include program instructions, data files, data structures, and the like. The program instructions recorded in the media may be specially designed and configured for the embodiment, or may be readily available and well known to computer software experts.

Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured such that it operates as one or more software modules in order to perform the operations of the embodiment, and vice-versa.

Through the system and method for generating a security profile for a container instance according to an embodiment of the present invention, it is possible to generate a security profile for minimizing privileges that allow a container instance to access system calls while ensuring high availability of the container instance.

Through the system and method for generating a security profile for a container instance according to an embodiment of the present invention, the chances of a container escape problem, which exploits the vulnerability of system calls, may be minimized, and the problem in which the availability of a container is reduced due to application of the wrong security profile may be solved.

Meanwhile, the above description is merely specific embodiments for practicing the present invention. The present invention encompasses not only concrete and available means but also the technical spirit corresponding to abstract and conceptual ideas that may be used as future technology.

What is claimed is:

1. An operation method of a system for generating a security profile of a security instance, comprising:
   extracting executable code and a library file from a container, thereby identifying a target to be analyzed;
   performing binary static analysis for the executable code and the library file to generate a system call list; and
   generating a Secure Computing Mode (SECCOMP) security profile based on the system call list,
   wherein the performing the binary static analysis comprises:
   identifying a dynamic linking relationship between the executable code and the library file;
   identifying direct and indirect system calls invoked in the executable code and the library file; and
   generating the system call list for the identified system calls, wherein the performing the binary static analysis further comprises:
identifying a value of an Extended Accumulator Register (EAX) or an rdi/edi register referred to by the direct or indirect system calls, and if necessary, performing a detailed control flow analysis to trace the value of the register.

2. The operation method of claim 1, wherein the identifying the target to be analyzed comprises:
requesting image metadata and an image file, which correspond to the container, from a container image storage;
acquiring the image metadata and the image file from the container image storage; and
running the container using the image metadata and the image file.

3. The operation method of claim 2, wherein the identifying the target to be analyzed further comprises:
identifying the executable code and the library file, which are loaded together with the container when the container is run; and
extracting the identified executable code and library file.

4. The operation method of claim 3, wherein the executable code and the library file executed inside the container are collected with reference to proc filesystem information of the container in a host.

5. The operation method of claim 1, wherein the generating the SECCOMP security profile comprises:
generating a whitelist for system calls using the system call list.

6. The operation method of claim 5, wherein the generating the SECCOMP security profile further comprises:
generating the SECCOMP security profile in a format applicable in a target container platform environment.

7. The operation method of claim 5, further comprising:
adding the generated SECCOMP security profile in a security profile save location in a container host.

8. The operation method of claim 7, wherein, when the container is run, the container host filters system calls invoked by the container based on the SECCOMP security profile.

9. A system for generating a security profile of a security instance, comprising:
at least one processor; and
memory for storing at least one instruction executed by the at least one processor,
wherein the at least one instruction is configured such that an analysis target identification subsystem identifies an analysis target by extracting executable code and a library file from a container, such that a binary static analysis subsystem performs binary static analysis for the executable code and the library file to generate a system call list, and such that a security profile generation subsystem generates a Secure Computing Mode (SECCOMP) security profile based on the system call list,
wherein the analysis target identification subsystem, the binary static analysis subsystem, and the security profile generation subsystem are virtualized systems,
wherein the binary static analysis subsystem comprises:
a binary dependency analysis module for detecting a reference relationship between the executable code and the library file;
a system call identification module for identifying direct or indirect system calls invoked in the executable code and the library file; and
a detailed control flow analysis module for analyzing a detailed control flow through control flow tracking, symbolic execution, or concolic testing to trace a value of an Extended Accumulator register (EAX) or a rdi/edi register referred to by the system call, the value being an argument of the system call.

10. The system of claim 9, wherein the analysis target identification subsystem comprises:
a container instance execution module for running the container after acquiring an image corresponding to the container from a container image storage;
an information collection module for collecting information about an application and a shared library executed inside the container; and
an analysis target identification module for extracting the executable code and the library file from a filesystem of the container based on the collected information.

11. The system of claim 9, wherein the security profile generation subsystem comprises:
a security profile conversion module for receiving the system call list and generating a security profile in a format used in a container host;
a security profile delivery module for saving the security profile in a security profile save location in the container host; and
a security profile database for storing the security profile.

12. The system of claim 11, wherein records of the security profile database include container instance information, information about an installed application, and the security profile.

13. A container virtualization system comprising:
a container host; and
a security profile generation system,
wherein the security profile generation system comprises:
at least one processor; and
memory for storing at least one instruction executed by the at least one processor,
wherein the at least one instruction is configured such that an analysis target identification subsystem identifies an analysis target by extracting executable code and a library file from a container, such that a binary static analysis subsystem performs binary static analysis for the executable code and the library file to generate a system call list, and such that a security profile generation subsystem generates a Secure Computing Mode (SECCOMP) security profile based on the system call list,
wherein the binary static analysis subsystem comprises:
a binary dependency analysis module for detecting a reference relationship between the executable code and the library file;
a system call identification module for identifying direct or indirect system calls invoked in the executable code and the library file; and
a detailed control flow analysis module for analyzing a detailed control flow through control flow tracking, symbolic execution, or concolic testing to trace a value of an Extended Accumulator Register (EAX) or a rdi/edi register referred to by the system call.

14. The container virtualization system of claim 13, wherein the analysis target identification subsystem comprises:
a container instance execution module for running the container after acquiring an image corresponding to the container from a container image storage;

an information collection module for collecting information about an application and a shared library executed inside the container; and an analysis target identification module for extracting, the executable code and the library file from a filesystem of the container based on the collected information.

15. The container virtualization system of claim 13, wherein the security profile generation subsystem comprises:

a security profile conversion module for receiving the system call list and generating a security profile in a format used in the container host;

a security profile delivery module for saving the security profile in a security profile save location in the container host; and a security profile database for storing the security profile.

16. The container virtualization system of claim 15, wherein records of the security profile database include container instance information, information about an installed application, and the security profile.

* * * * *